United States Patent
Baliga et al.

[11] Patent Number: 6,150,659
[45] Date of Patent: Nov. 21, 2000

[54] DIGITAL MULTI-FREQUENCY INFRARED FLAME DETECTOR

[75] Inventors: Shankar Baliga, Irvine; Herbert H. Rabe, Laguna Beach; Brett Bleacher, Aliso Viejo, all of Calif.

[73] Assignee: General Monitors, Incorporated, Lake Forest, Calif.

[21] Appl. No.: 09/058,662

[22] Filed: Apr. 10, 1998

[51] Int. Cl.[7] .................................................. G01J 5/02
[52] U.S. Cl. ..................................... 250/339.15; 250/342
[58] Field of Search ......................... 250/339.15, 339.14, 250/342; 356/346, 213, 226, 904; 136/213; 340/584, 500, 501

[56] References Cited

U.S. PATENT DOCUMENTS

| | | | |
|---|---|---|---|
| 3,122,638 | 2/1964 | D. F. Steele et al. ................. | 250/83.3 |
| 3,739,365 | 6/1973 | Muller .................................. | 340/228.2 |
| 3,761,715 | 9/1973 | Menzies ................................. | 250/338 |
| 3,825,754 | 7/1974 | Cinzori et al. ........................ | 250/338 |
| 3,931,521 | 1/1976 | Cinzori ................................. | 250/339 |
| 4,206,454 | 6/1980 | Schapira et al. ..................... | 340/578 |
| 4,220,857 | 9/1980 | Bright .................................. | 250/339 |
| 4,249,168 | 2/1981 | Muggli ................................. | 340/578 |
| 4,296,324 | 10/1981 | Kern et al. ........................... | 250/339 |
| 4,639,598 | 1/1987 | Kern et al. ........................... | 250/339 |
| 4,983,853 | 1/1991 | Davall et al ........................ | 250/554 |
| 5,537,336 | 7/1996 | Joyce ................................... | 364/510 |
| 5,612,676 | 3/1997 | Plimpton et al. ..................... | 340/578 |
| 5,807,750 | 9/1998 | Baum et al. .......................... | 436/164 |
| 5,923,422 | 7/1999 | Keens et al. .......................... | 356/346 |
| 5,959,730 | 9/1999 | Wang et al. .......................... | 356/346 |
| 5,963,322 | 10/1999 | Rapp et al. ........................... | 356/346 |

FOREIGN PATENT DOCUMENTS 0 588 753 A1   3/1994   European Pat. Off. .

*Primary Examiner*—Seungsook Ham
*Assistant Examiner*—John Patti

[57] ABSTRACT

A flame detector consisting of a first infrared radiation detector for detecting radiation from combustion of hydrocarbon and other carbon containing compounds in conjunction with a second infrared radiation detector for distinguishing radiation from other sources such as modulated sunlight, reflections, artificial as well as natural hot objects, illuminating light sources, and arc welders. The flame detector uses two electronic circuits following the first infrared detector such that a fire is sensed by either of the two circuits depending on its size, one circuit being optimized for flicker frequencies present in a large fire while the second circuit simultaneously checks for optical signals at flicker frequencies dominant in a smaller fire. The two electronic outputs along with the output of the second infrared detector are digitally processed and analyzed for spectral and temporal characteristics to distinguish the presence of a real fire from that of various false alarm sources. The flame detector is provided with digital serial communications so as to output its status, permit changes in the programming of operating parameters and modes and permit troubleshooting via remote control.

25 Claims, 5 Drawing Sheets

DIGITAL MULTI-FREQUENCY INFRARED FLAME DETECTOR

TECHNICAL FIELD OF THE INVENTION

This invention relates to optical flame detectors used to detect the start and occurrence of fires by their characteristic emission in specific parts of the electromagnetic spectrum. More particularly, it relates to an apparatus to monitor the start and occurrence of fires produced by combustion of hydrocarbons and other carbon containing compounds by detecting their emission in the infrared section of the electromagnetic spectrum.

BACKGROUND OF THE INVENTION

The present invention pertains to the field of flame detection, and is particularly adapted to prevent false alarms generated by modulated and time varying sources of background radiation such as the sun, welders, hot objects and artificial lights. Flame detectors are presently available which are solar blind to steady sunlight but will not function properly if the sunlight incident on the detector is modulated, or time varying as when an object passes between the sun and the sensor in the sensor's field of view. Modulation of reflected sunlight by ocean waves and ripple is known to cause false alarms at offshore oil platforms with existing flame detection equipment.

Conventional flame detectors also have difficulties in detecting big fires since the high optical intensity emitted by the big fire causes saturation of the electronics following the optical detector. It is known that big fires have a larger proportion of the flicker occurring at higher frequencies than small fires.

U.S. Pat. No. 4,639,598, Kern et al., and U.S. Pat. No. 3,931,521, Cinzori, disclose use of two detectors, one operating at far infrared (7 to 25 microns) and the other at near infrared (0.8 to 1.1 microns) wavelengths. This approach suffers due to several reasons, including a) reduced sensitivity due to lower infrared emission by fires in the far infrared wavelength range as compared to strong $CO_2$ emission at 4.3 microns from hydrocarbon fires, b) reduced sensitivity of thermal detectors available for the far infrared wavelength range compared to photoconductive detectors for shorter wavelengths, and c) necessity to look at spurious signals in the near infrared, caused by a large number of sources unrelated to fires, and also in the far infrared due to sources strongly emitting such as human or animal presence, both resulting in overburdening of the processor.

SUMMARY OF THE INVENTION

It is an object of the present invention to provide a flame detector able to respond to fires produced by hydrocarbons and other carbon containing compounds, ranging from fires that are small to those that are large in size.

It is another object of the present invention to provide a flame detector, which is immune to modulated or time varying false alarm sources such as reflected sunlight, radiation from welders, hot objects and artificial lights.

It is another object of the present invention is to provide a flame detector, which is immune to steady or D.C. false alarm radiation sources such as hot objects and artificial lights.

Another object of the present invention is to provide a flame detector able to respond to hydrocarbon fires in the presence of one or more potential false alarm sources.

A further object of the present invention is to provide a flame detector, which responds to user commands and also outputs its status via a digital serial communication.

In accordance with one aspect of the present invention, a flame detector looks for mid-infrared radiation at specific wavelengths from hydrocarbon flames and other sources at a shorter infrared wavelength, and overcomes the drawbacks noted above. The optical bandwidth of the second infrared detector is selected so as to discriminate against known and quantified false alarm sources such as modulated sunlight and different types of welders, through experimentation and spectral analysis. Further discrimination of false alarms is achieved by rejecting low-level signals by comparing with a threshold value, and by permitting only signals present for a given period of time to actuate the alarm. Thus, an exemplary embodiment of the present invention uses two electronic circuits following the infrared detectors such that a fire is sensed by either of the two circuits depending on its size, one circuit being optimized for the higher flicker frequencies present in a large fire while the second circuit simultaneously checks for optical signals at flicker frequencies dominant in a smaller fire. Further discrimination of the big or steady fire from potential false alarms is achieved by looking for a lack of periodicity in the high frequency flicker signal, since it is known and characterized that the flicker from fires is not periodic.

The flame detector described herein comprises two broadband infrared radiation sensors, one of which is responsive to radiation strongly emitted by hydrocarbon fires and the fires from other carbon containing compounds in the 4.2 to 4.8 micron wavelength region, and referred to as F (flame channel). Strong $CO_2$ emission in this wavelength region results in a long range flame detector, capable of detecting a one foot square gasoline pan fire at a distance of over one hundred feet. The second infrared radiation detector senses radiation in the 2.0 to 2.4 micron wavelength region and is referred to as S (sun channel). This second wavelength region is selected for the following reasons, a) no $CO_2$ vibrational band emission is produced by hydrocarbon fires in this wavelength region as in the 4.2 to 4.8 micron region, b) strong intensity at this wavelength from sunlight, welders and other hot objects, and c) adequate atmospheric transmission at this wavelength over the distances of interest (100 feet).

In a specific embodiment of the invention, the radiation sensors are both photoconductive devices with the above mentioned optical filters. Lead selenide (PbSe) is suited for the 4.2 to 4.8 micron wavelength detector (F), whereas lead selenide or lead sulfide (PbS) may be used for the 2.0 to 2.4 micron detector (S). In the following discussion, it is assumed that both detectors are photoconductive PbSe, though other radiation detectors such as thermal, pyroelectric or photovoltaic can also be used with the optical filters. Each lead selenide detector comprises a photoconductive active element that receives the radiation. Optical windows are placed directly in front of each detector. In the case of the flame (F) channel, sapphire is used, while the second detector (S) can use windows made of quartz or infrared transmissive glass.

The output of detector F is split into two electrical paths one of which leads to a low frequency (2 to 12 Hz) amplifier. This amplifier/filter looks at the low frequency flicker typical of small and medium flames. The second electrical path contains a high frequency (40 to 100 Hz) amplifier that is used to look at the higher frequency flicker from big fires and steady fires. A fire is detected by either of the two circuits so that all sizes of fires are detected. Further discrimination of the big fire from potential false alarms is achieved by looking for a lack of periodicity in the high frequency flicker signal, since it is known and characterized that the flicker from fires is not periodic. D.C. or steady sources of optical radiation are also eliminated as potential false alarm sources since the detectors and electronics only respond to frequencies above 2 Hz.

In operation, the sensor continuously checks the amplitude and the ratio of the low frequency outputs of the sun and flame channels (S/F); this ratio is done by the microprocessor which averages the digital signals produced by an analog to digital converter following each amplifier. A ratio exceeding a preset level indicates the presence of sunlight and other spurious sources such as welders and artificial lights. In the absence of such sources, a fire is indicated by the flame channel signal exceeding its threshold in conjunction with a flicker count of 3 or more transitions in 500 milliseconds. In the presence of spurious sources, the flame signal flicker from a real fire occurs in the same time period, e.g. 500 msec, as the flicker from the spurious source. However, continuous examination of the ratio of S to F can discriminate the spurious flicker from the flame flicker. The sensor counts only those flickers which exceed the threshold and are also identified as being caused by the flame. Owing to the random timing between subsequent flame flickers, the probability of sun and flame flicker signals overlapping for more than one flicker in a measurement period is very remote.

BRIEF DESCRIPTION OF THE DRAWING

The and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

In accordance with an aspect of the invention, spurious sources are discriminated by the use of two infrared radiation detectors. The first infrared detector is sensitive to the wavelengths strongly emitted by hydrocarbon fires (4.2 to 4.8 microns) and the fires from other carbon containing materials, which generate carbon dioxide on combustion. Very little solar radiation in this wavelength region penetrates the atmosphere due to absorption by the carbon dioxide present in the atmosphere (about 330 parts per million at sea level) resulting in a high level of immunity to sunlight which has traveled through many miles of the atmosphere. The second infrared detector looks for the heat generated by the various spurious sources such as modulated sunlight or welders and provides for further discrimination of radiation emitted by fires. A high degree of false alarm immunity is achieved by digitally ratioing the signal at the two wavelengths and comparing with experimentally derived ratio values stored in memory in the flame detector.

Figure 1:
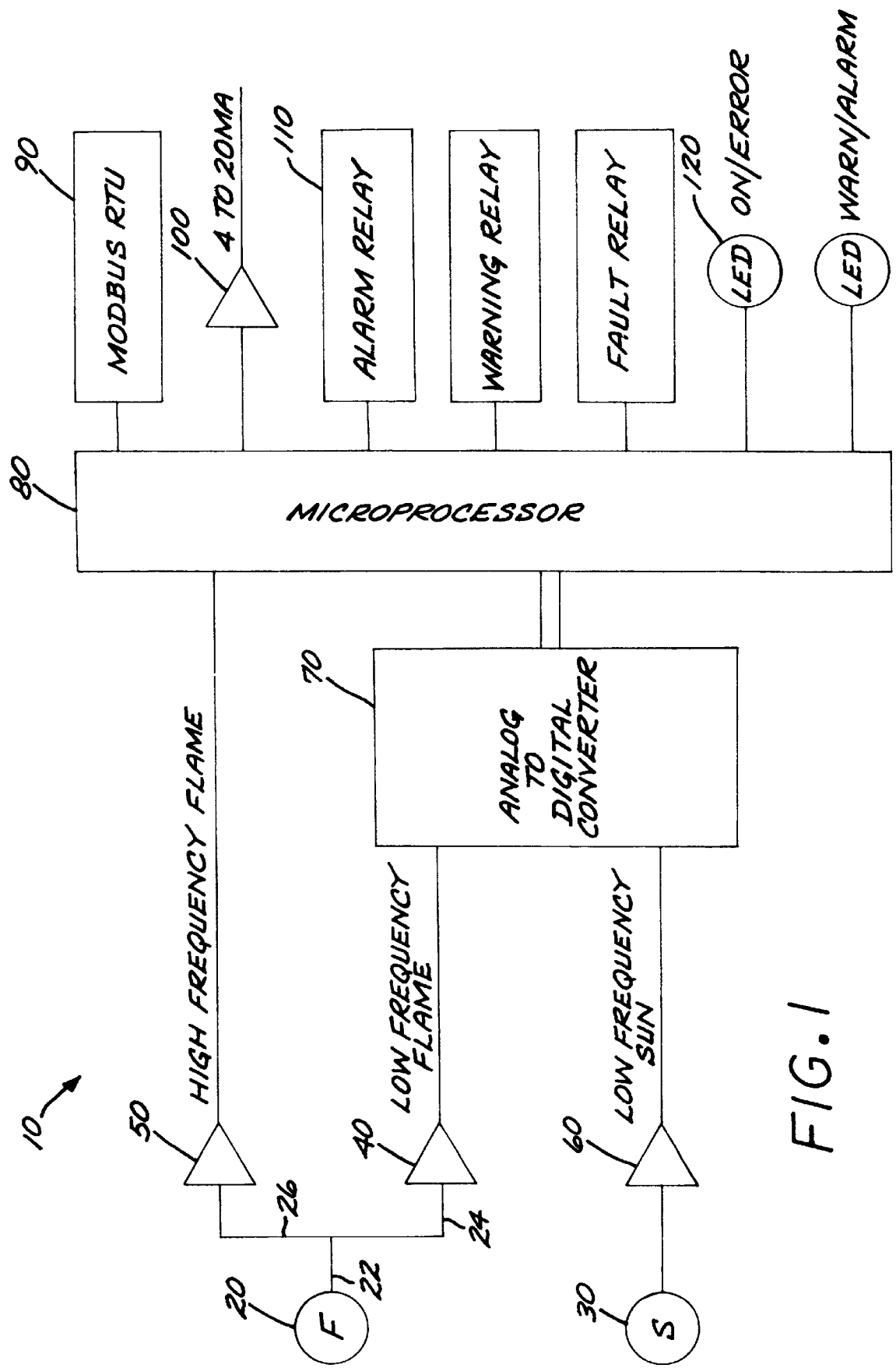
FIG. 1 is a block diagram representation of the digital multi-frequency infrared flame detector according to the invention.

Referring first to FIG. 1, the components of an exemplary embodiment of a digital multi-frequency infrared flame detector system 10 in accordance with this invention are shown. The flame detector system comprises two broadband infrared radiation sensors 20 and 30. The first sensor 20 is responsive to radiation emitted by hydrocarbon fires in the 4.2 to 4.8 micron wavelength region, and is labeled "F". The second infrared radiation sensor 30 senses radiation in the 2.0 to 2.4 micron wavelength region and is labeled S since its primary use is to discriminate against sunlight. These sensors are typically photoconductive lead selenide with integral optical filters but other sensors responsive in these wavelength regions such as pyroelectric detectors may also be used.

The electrical output 22 of the first detector 20 is split into two electrical paths 24 and 26. The first path 24 leads to a low frequency amplifier 40 with a bandpass of between 2 and 12 Hz. This amplifier/filter 40 looks at the 10 Hz flickers typical of small and medium flames. The second electrical path 26 from the detector 20 leads to a high frequency amplifier 50 whose electrical bandwidth is between 40 and 100 Hz. This second amplifier/filter 50 looks at the higher frequencies that are present in larger fires and are not detected by the first amplifier 40. The electrical output of the second infrared (S) detector 30 leads to a low frequency amplifier 60 with similar gain and bandpass as the first low frequency amplifier 40.

The outputs of both low frequency amplifiers 40 and 60 are converted into digital levels by an analog to digital (A to D) converter 70. The digital output of the analog to digital converter 70 is analyzed by the microprocessor 80, which is programmed to perform calculations to be described below.

The output of the high frequency amplifier 50 is also analyzed by the microprocessor 80. No conversion to digital values is required in this exemplary embodiment for the output of this amplifier since it is designed to cross threshold values close to the bias rail values, i.e. the maximum values the amplifier can output; that is, it is inherently digital in nature. The microprocessor 80 looks for the output of this amplifier in real time so the periodicity of the signal as it crosses the threshold values can be calculated. This is described further as the software flow diagrams are explained below. An exemplary microprocessor suitable for the purpose is the Motorola M68HC11 device.

The infrared flame detector 10 can output the warning and alarm information on detection of a fire via (i) a serial communication data bus 90, using in this exemplary embodiment a serial communication protocol called Modbus RTU, (ii) via an analog 4 to 20 mA current loop 100, and (iii) via relays 110 or LED displays 120. The relays can be used to activate fire suppression systems and/or fire alarm systems. The digital information provided via the serial communication data bus 90 provides performance and diagnostic information regarding the infrared flame detector 10. This exemplary Modbus interface is also capable of linking up to 128 units with a master controller, or up to 247 units with a repeater. Other communication protocols that may also be used include DeviceNet (Canbus) and Fieldbus; all are well known in the art.

Figure 2:
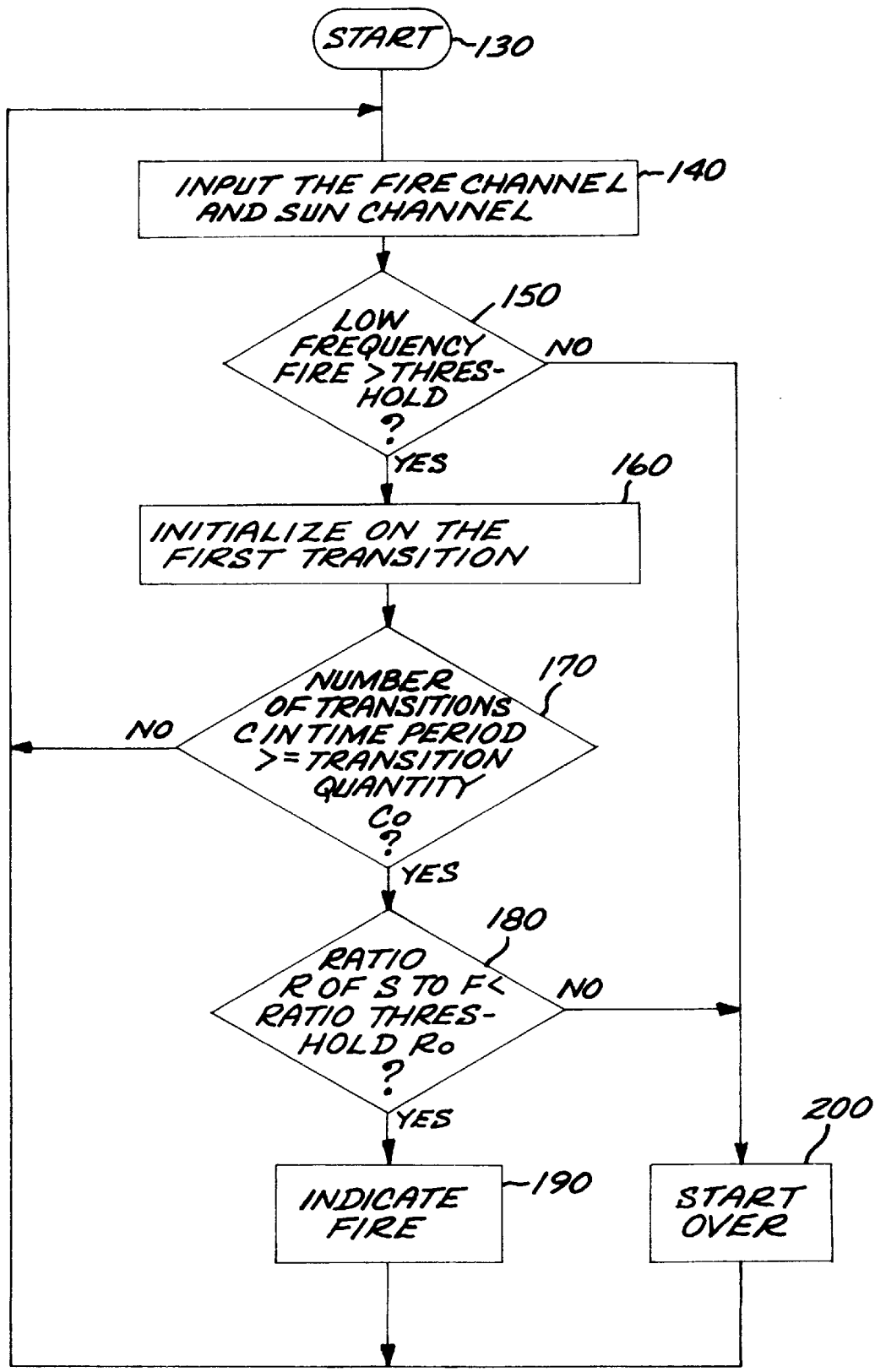
FIG. 2 is a flow diagram illustrative of the algorithm used in the digital multi-frequency infrared flame detector in order to detect a small or medium sized fire.

FIG. 2 shows an exemplary flow diagram of the operation of the digital multi-frequency infrared flame detector 10 with regard to the low frequency flame and sun channels. The flame detector continually looks for optical radiation, that is, the algorithm keeps repeating the loop shown in FIG. 2. However, to illustrate the algorithm, a start point is assumed, which is labeled 130. The inputs from the low frequency flame (40) and sun (60) channels after digitization by the A to D converter 70 are analyzed by the microprocessor 80 at step 140. If the low frequency flame detector output after digitization is at any instant greater than a preset threshold value, the microprocessor starts a counter, at step 160. If the low frequency flame detector output after digitization continues to be less than the threshold value, then the process of looking continues without starting the counter via the start over step 200. In this fashion, the microprocessor continually looks for the low frequency flame detector output after digitization to indicate signals greater than threshold and hence, a possible fire.

If and when the low frequency flame detector output crosses the threshold (step 150) and the counter is started (step 160), the microprocessor 80 counts subsequent transitions where the output crosses the threshold, at step 170. In order to indicate a possible fire the number of counts C in a preset time interval To must exceed a transition quantity Co. Typically, the time period To is one half of a second and the number of transitions required Co is 3 or more. If fewer transitions occur in the time period the process of looking for the fire continues and the counter is reset to zero. If the number of transitions in the time period is greater than the transition quantity, the microprocessor 80 next examines the ratio of the low frequency sun detector output to the low frequency flame detector output, at step 180. This ratio is done using the average of the signals in the time duration To. This is possible because the microprocessor 80 continually measures and averages the low frequency flame and sun detector outputs. In order to signal the presence of a fire the ratio R of the average sun signal to the average flame signal calculated at step 180 must not exceed a ratio threshold Ro. If ratio R exceeds the ratio threshold Ro, the infrared radiation is deemed to be produced by a false alarm source; the flame detector continues looking via start over step 200. If ratio R is less than the ratio threshold Ro the flame detector signals the presence of a fire at step 190 via one or more of the output modes described above.

Figure 3:
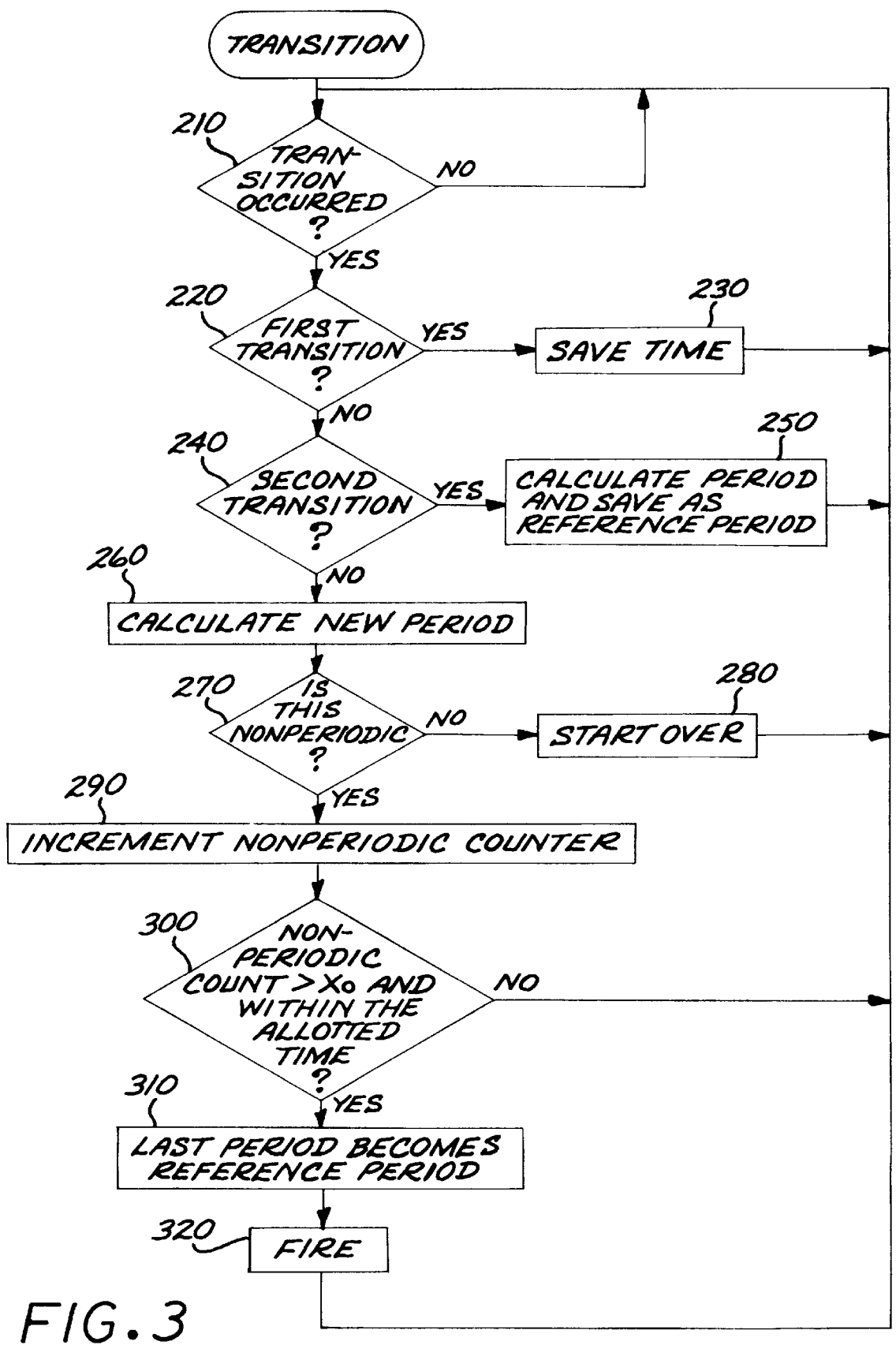
FIG. 3 is a flow diagram illustrative of the algorithm used in the digital multi-frequency infrared flame detector in order to detect a large fire.

FIG. 3 shows an exemplary flow diagram of the operation of the digital multi-frequency infrared flame detector 10 with regard to the detection of large fires. A large fire generates higher frequency optical flickers or fluctuations than a small fire. These high frequency flickers are amplified and filtered by the amplifier 50 and analyzed by the microprocessor 80. The microprocessor looks for the output of the amplifier 50 to cross preset voltage levels. Each such crossing is termed a transition. The first such transition is monitored at steps 210, 220 and the time at which this first transition occurs is noted by the microprocessor 80 at step 230. The microprocessor 80 continues to look for subsequent transitions. The second transition is encountered at 240 and the time between transitions is calculated and saved as a reference period at step 250. The microprocessor 80 continues to look for transitions and calculates the period between subsequent transitions at step 260, which period is called the "new" period. The new period is compared with the previous period at step 270. If the periods are equal the microprocessor 80 starts over again at step 280. If the periods are unequal, the microprocessor increments a non-periodic counter at step 290. The number of such non-periods X occurring within a preset time Yo is compared with a preset value Xo, at step 300. If the number of non-periodic counts X is less than the value Xo, the microprocessor branches back to step 210 to start the transition counting process again. Else, if the number of non-periods X within the time period Yo is greater than the vale Xo, the last period is stored as the reference period at step 310 and the presence of a large fire is indicated at step 320. Typical values of Xo and Yo are 10 non-periods within a time interval of one half second.

The rejection of periodic high frequency infrared radiation via the rejection of the periodic signals passing through amplifier 50 improves the false alarm immunity of the digital multi-frequency infrared flame detector. This is because the flickers of a fire are known by measurement to be non-periodic, unlike the majority of potential high frequency false alarms.

In the event of a fire that starts small and then grows into a large fire, it is observed that initially the low frequency channels 40 and 60 indicate the presence of the fire, and then subsequently the high frequency channel 50 indicates the presence of the large fire through the use of the algorithms illustrated in FIGS. 2 and 3. The preset values of Co and To for the low frequency algorithm and Xo and Yo for the high frequency algorithm are set so that there is no size of fire from small through medium to large where either the low frequency channel or the high frequency channel does not indicate a fire. That is, the values of the constants can be set so that the low and high frequency channels overlap in their indication of a fire, such overlap occurring for a medium sized fire. If the purpose of the flame detector 10 is to monitor the size of a steady fire the above values can be adjusted to fit the flicker frequencies of the steady fire.

Since the flame detector 10 communicates via a serial communications data protocol such as Modbus RTU 90, the values of the parameters such as Co, To, Xo, Yo and Ro can also be modified via the serial communication protocol. These features enable the digital multi-frequency infrared flame detector 10 to continually monitor the time evolution of a fire in addition to the normal function of alarming at preset levels. The speed of response of the flame detector is determined by the values selected for the time periods To and Yo, which have been indicated to be about half a second.

Although the algorithms of FIGS. 2 and 3 are shown to occur separately, in practice the microprocessor 80 continually performs both algorithms simultaneously. Hence, the response speed of the flame detector is just the larger of To and Xo, and not the sum of Xo and To.

Figure 4:
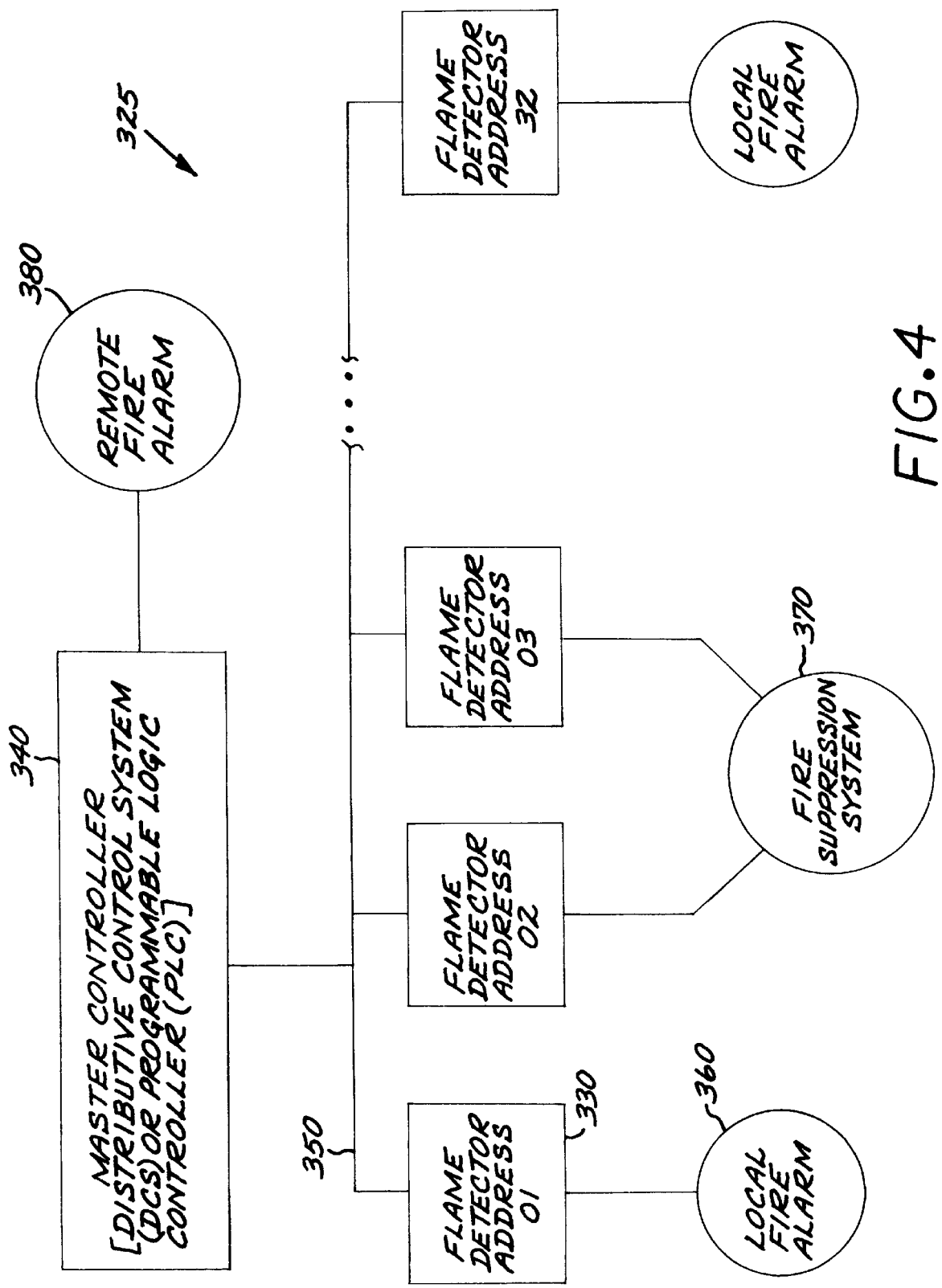
FIG. 4 is a block diagram of a fire control system, showing several flame detectors connected to a master controller and fire alarm and suppression systems.

FIG. 4 is a system level block diagram of a fire detection system 325 employing a plurality of fire detectors 330 in accordance with the invention. The fire detectors 330 are assigned individual addresses (e.g. 01, 02, 03 . . . ), and are connected to a master controller 340 by a serial communication data bus 350. In the event of a fire being detected by one or more of the fire detectors 330, local fire alarms 360 and fire suppression systems 370 may be activated directly by the respective flame detector, e.g. via a relay 110 (FIG. 1). Additionally, the master controller 340 may active a remote fire alarm 380.

Figure 5:
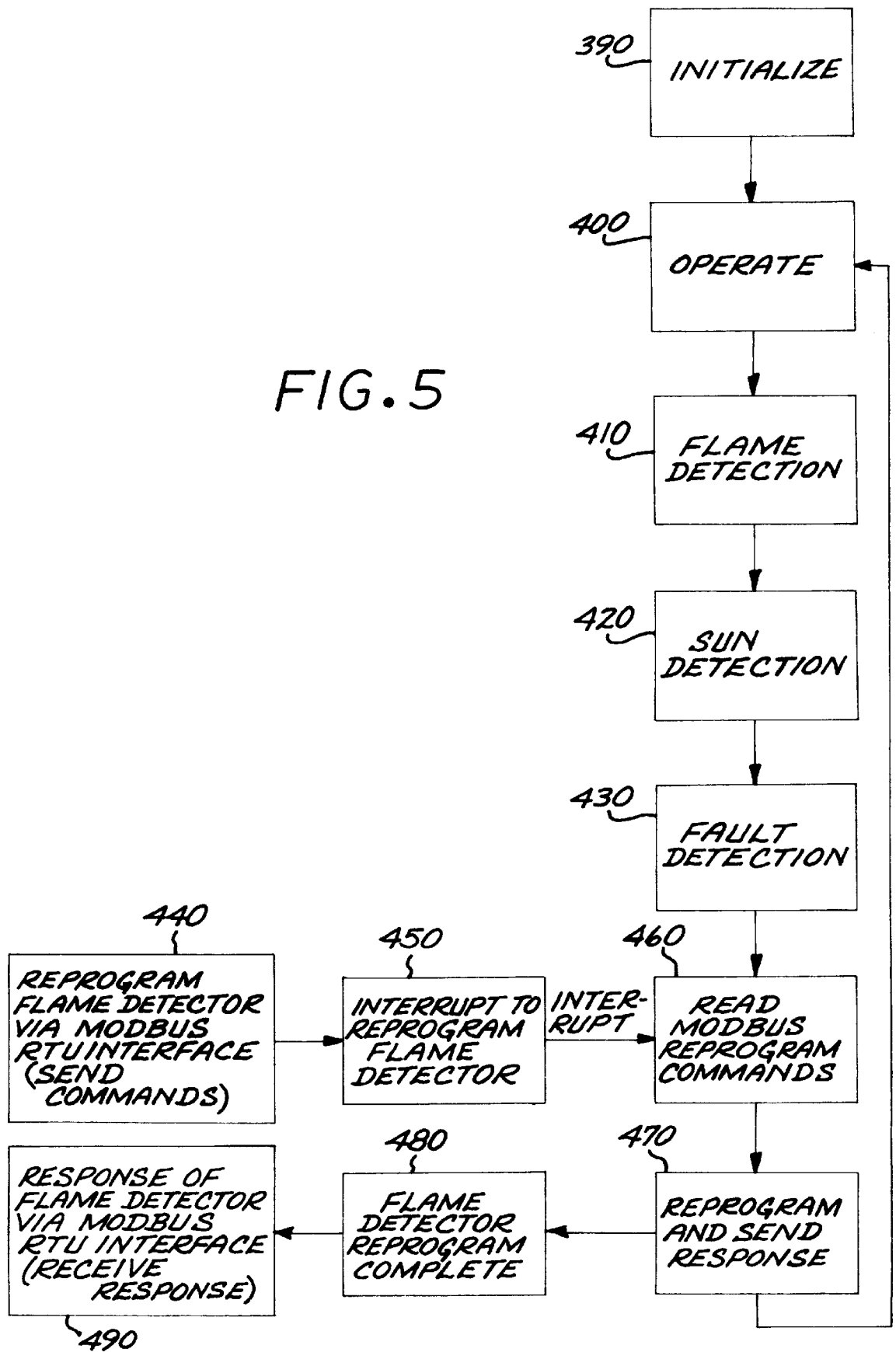
FIG. 5 is a flow diagram illustrating a technique for reprogramming a flame detector in accordance with the invention using a serial communication link.

Using a serial communications protocol such as Modbus RTU, the master controller is also able to reprogram the flame detectors 330 using the serial communications data bus 350. This is shown in the flow diagram of FIG. 5. When the flame detector is initialized at step 390 by turning power on, it becomes operational (step 400), and looks continuously for a fire (step 410), false alarms such as the sun (step 420), and also for faults in its operation (step 430) such as a dirty window. These processes go on continuously. In addition, if reprogramming of the flame detector is desired, the master controller 340 sends a reprogram command (step 440), which interrupts the normal sequence of events. The flame detector reads the reprogram command (step 450), executes it (step 470), and sends a response (480) to the master controller 340 that the reprogramming is complete (step 480). Typical flame detector parameters that can be reprogrammed are detector sensitivity, speed of response, and data transmission rate (baud rate) between the detector and master controller 340. Normal operation of the flame detector thereafter continues.

It is understood that the above-described embodiments are merely illustrative of the possible specific embodiments which may represent principles of the present invention. Other arrangements may readily be devised in accordance with these principles by those skilled in the art without departing from the scope and spirit of the invention. While the preferred embodiment has employed a microprocessor, other embodiments could employ hard-wired logic circuits to perform the logical steps indicated in FIGS. 2 and 3.

What is claimed is:

1. A flame detection apparatus for detecting fires, comprising:
    first and second infrared detectors, said first detector sensitive to a wavelength emitted by combustion of hydrocarbons and other carbon containing materials, said second detector sensitive to infrared wavelengths present in sunlight and emitted by artificial radiation sources;
    a data acquisition system coupled to outputs of said first and second infrared detectors, said system adapted to analyze and interpret the signals generated by the two infrared detectors to detect radiation from a fire while distinguishing sunlight and artificial radiation sources, said system including a first channel coupled to a first detector output of said first detector for analyzing the flicker rate of low frequency components of said first detector output to detect amplitude fluctuations characteristic of small fires, and a second channel coupled to said first detector output for analyzing the flicker rate of high frequency components of said first detector output to detect amplitude fluctuations characteristic of large fires.

2. The apparatus of claim 1 wherein said data acquisition system includes a third channel responsive to an output of said second infrared detector to determine an amplitude of a signal produced by said second infrared detector, and apparatus for rejecting, as a false alarm, signals in which the ratio of amplitudes of signals produced by said second and first infrared detectors exceeds a threshold.

3. The apparatus of claim 1 wherein said first channel rejects, as a false alarm, small amplitude output signals from said first infrared detector and signal of time duration below a threshold time duration.

4. The flame detection apparatus of claim 1, wherein the first and second infrared detectors are photoconductive lead selenide infrared detectors.

5. The flame detection apparatus of claim 1, wherein the first infrared detector is responsive in the 4.2 to 4.8 micron wavelength region.

6. The flame detection apparatus of claim 1, wherein the second infrared detector is responsive to the 2.0 to 2.4 micron wavelength region.

7. The flame detection apparatus of claim 1, wherein the said data acquisition system comprises a microprocessor adapted to execute an algorithm to indicate the occurrence of a hydrocarbon fire or a carbon containing fire.

8. An optical flame detection apparatus with ability to detect fires, comprising:
    first and second infrared detectors, said first detector sensitive to a wavelength emitted by combustion of hydrocarbons and other carbon containing materials, said second detector sensitive to infrared wavelengths present in sunlight and emitted by artificial radiation sources, said second detector insensitive to said wavelength emitted by combustion of hydrocarbons and other carbon containing materials;
    a first low frequency bandpass filter coupled to an output of said first infrared detector;
    a second low frequency bandpass filter coupled to an output of said second infrared detector;
    a high frequency bandpass filter coupled to said output of said first infrared detector;
    a data acquisition system coupled to outputs of said first and second low frequency bandpass filter and said high frequency bandpass filter, said system adapted to analyze and interpret the signals generated by the two infrared detectors to detect radiation from a fire while distinguishing sunlight and artificial radiation sources.

9. The flame detection apparatus of claim 8, further comprising a digital communication link connecting said data acquisition system to an external central processor.

10. The flame detection apparatus of claim 8, wherein the first and second infrared detectors are photoconductive lead selenide infrared detectors.

11. The flame detection apparatus of claim 8, wherein the first infrared detector is responsive in the 4.2 to 4.8 micron wavelength region.

12. The flame detection apparatus of claim 8, wherein the second infrared detector is responsive to the 2.0 to 2.4 micron wavelength region.

13. The flame detection apparatus of claim 8, wherein the said data acquisition system comprises a microprocessor adapted to execute an algorithm to indicate the occurrence of a hydrocarbon fire or a carbon containing fire, by analyzing the outputs of the low and high frequency amplifiers.

14. The flame detection apparatus of claim 8, wherein the data acquisition system comprises a microprocessor adapted to execute an algorithm to distinguish the infrared radiation emitted by a fire from that emitted by false alarm sources, including modulated or reflected sunlight, arc welders, hot objects or artificial lights.

15. The flame detection apparatus of claim 14, wherein said microprocessor comprises an algorithm to detect and respond to radiation from a fire in the presence of radiation from said false alarm sources.

16. The flame detection apparatus of claim 8, wherein the said data acquisition system comprises a microprocessor adapted to execute an algorithm to distinguish the infrared radiation emitted by a fire from that emitted by steady or D.C. false alarm radiation sources including hot objects and artificial lights, wherein said flame detection apparatus is immune to presence of said steady or D.C. false alarm radiation sources.

17. The flame detection apparatus of claim 8, wherein said first low frequency filter has a nominal bandpass of between 2 Hz and 12 Hz to analyze flame flicker characteristic of small fires produced by the combustion of hydrocarbons and carbon containing compounds.

18. The flame detection apparatus of claim 8, wherein said high frequency filter has a nominal bandpass of between 40 Hz and 100 Hz to analyze flame flicker characteristic of large or steady fires produced by the combustion of hydrocarbons and carbon containing compounds.

19. A flame detection system, comprising:
    a central controller;
    a plurality of remotely located programmable optical flame detection apparatus;

a digital data bus connecting said central controller and said plurality of flame detection apparatus to exchange data including programming data instructions between said central controller and said plurality of flame detection apparatus;

wherein each of said optical flame detection apparatus includes:

first and second infrared detectors, said first detector sensitive to a wavelength emitted by combustion of hydrocarbons and other carbon containing materials, said second detector sensitive to infrared wavelengths present in sunlight and emitted by artificial radiation sources;

a data acquisition system coupled to outputs of said first and second infrared detectors, said system adapted to analyze and interpret the signals generated by the two infrared detectors to detect radiation from a fire while distinguishing sunlight and artificial radiation sources, said system including a first channel coupled to a first detector output of said first detector for analyzing the flicker rate of low frequency components of said first detector output to detect amplitude fluctuations characteristic of small fires, and a second channel coupled to said first detector output for analyzing the flicker rate of high frequency components of said first detector output to detect amplitude fluctuations characteristic of large fires.

20. The system of claim 19 wherein said plurality of flame detector apparatus are each responsive to said programming data instructions to adjust detector sensitivity.

21. The system of claim 19 wherein each of said optical flame detection apparatus is assigned a unique address and is individually programmable in response to programming data commands addressed to said unique address.

22. An optical flame detection apparatus with ability to detect fires, comprising:

first and second infrared detectors, said first detector sensitive to a wavelength emitted by combustion of hydrocarbons and other carbon containing materials, said second detector sensitive to infrared wavelengths present in sunlight and emitted by artificial radiation sources, said second detector insensitive to said wavelength emitted by combustion of hydrocarbons and other carbon containing materials;

a first low frequency amplifier and a high frequency amplifier for amplifying respective low and high components of the signals generated by the second detector;

a second low frequency amplifier for amplifying low frequency components of the signals generated by the first detector;

a microprocessor based data acquisition system, said system to analyze and interpret the amplified signals generated by the two infrared detectors;

a digital communication link to an external central processor.

23. The flame detection apparatus of claim 22, wherein the first and second infrared detectors are photoconductive lead selenide infrared detectors.

24. The flame detection apparatus of claim 22, wherein the first and second infrared detectors are responsive in the 4.2 to 4.8 micron and 2.0 to 2.4 micron wavelength region respectively.

25. The flame detection apparatus of claim 22, further including analog-to-digital apparatus for digitizing outputs of said first low and high frequency amplifiers, wherein the said data acquisition system microprocessor is adapted to execute an algorithm to indicate the occurrence of a hydrocarbon fire or a carbon containing fire, by analyzing digitized outputs of the low and high frequency amplifiers.

* * * * *